(12) United States Patent
Bischelmeier et al.

(10) Patent No.: US 11,879,448 B2
(45) Date of Patent: Jan. 23, 2024

(54) ELECTROMAGNETIC ACTUATOR

(71) Applicant: Hoerbiger Wien GmbH, Vienna (AT)

(72) Inventors: Gernot Bischelmeier, Vienna (AT); Matthias Kornfeld, Brunn/Geb. (AT); Bernhard Spiegl, Vienna (AT)

(73) Assignee: Hoerbiger Wien GmbH, Vienna (AT)

( * ) Notice: Subject to any disclaimer, the term of this patent is extended or adjusted under 35 U.S.C. 154(b) by 0 days.

(21) Appl. No.: 17/127,427

(22) Filed: Dec. 18, 2020

(65) Prior Publication Data
US 2021/0190061 A1 Jun. 24, 2021

(30) Foreign Application Priority Data
Dec. 18, 2019 (AT) .............. A51113/2019

(51) Int. Cl.
*F04B 7/00* (2006.01)
*F16K 31/06* (2006.01)
*F04B 39/08* (2006.01)

(52) U.S. Cl.
CPC ............ *F04B 39/08* (2013.01); *F04B 7/0076* (2013.01); *F16K 31/0675* (2013.01)

(58) Field of Classification Search
CPC .. F16K 31/06; F16K 31/0655; F16K 31/0675; F16K 27/029; H01F 7/064; H01F 2007/062; H01F 27/08; H01F 27/22; F05B 2280/1021
See application file for complete search history.

(56) References Cited

U.S. PATENT DOCUMENTS

| 4,399,836 A | * | 8/1983 | de Versterre | ........ F15B 13/0835 |
| | | | | 251/129.05 |
| 4,796,661 A | * | 1/1989 | Hishinuma | .......... G05D 16/024 |
| | | | | 251/129.08 |
| 5,006,901 A | * | 4/1991 | Dick | ...................... H01F 7/1607 |
| | | | | 335/258 |
| 7,954,786 B2 | | 6/2011 | Narita et al. | |
| 8,408,516 B2 | * | 4/2013 | Dlugoss | ............. G05D 16/2024 |
| | | | | 251/129.15 |
| 8,783,650 B2 | * | 7/2014 | Querejeta Andueza | ..................... |
| | | | | F16K 27/02 |
| | | | | 251/129.22 |
| 9,521,781 B2 | * | 12/2016 | Frank | ....................... H01F 27/22 |
| 2004/0032164 A1 | | 2/2004 | Tsunooka et al. | |

(Continued)

FOREIGN PATENT DOCUMENTS

| CN | 104421483 A | 3/2015 | |
| DE | 102015006263 A1 | * 11/2016 | ......... F16K 31/0655 |

(Continued)

*Primary Examiner* — Matthew W Jellett
(74) *Attorney, Agent, or Firm* — Dykema Gossett PLLC

(57) ABSTRACT

Aspects of the present disclosure are directed to an electromagnetic actuator for actuating a valve of a piston compressor. Power electronics of the actuator are arranged in an actuator housing between a coil and an axial actuator end of the actuator, on which an actuation opening for an actuation element is provided, wherein the power electronics are separated from the coil by a housing wall of the actuator housing, wherein a printed circuit board of the power electronics is arranged on a fastening surface provided on the housing wall, wherein electrical coil contacts of the coil extend through the housing wall and are connected to the printed circuit board.

14 Claims, 2 Drawing Sheets

(56) References Cited

U.S. PATENT DOCUMENTS

| | | | |
|---|---|---|---|
| 2007/0272890 A1 | 11/2007 | Kopecek et al. | |
| 2012/0189467 A1* | 7/2012 | Allenspach | F04B 49/246 417/279 |
| 2012/0207623 A1* | 8/2012 | Allenspach | F04B 39/08 417/298 |

FOREIGN PATENT DOCUMENTS

| | | |
|---|---|---|
| EP | 2456978 B1 | 3/2016 |
| JP | S5543230 A | 3/1980 |

* cited by examiner

ELECTROMAGNETIC ACTUATOR

CROSS-REFERENCE TO RELATED APPLICATIONS

This application claims the benefit of priority to Austria application No. A 51113/2019, filed 18 Dec. 2019.

BACKGROUND

The invention relates to an electromagnetically actuated actuator for arrangement on a piston compressor, for actuating a valve of the piston compressor, wherein the actuator comprises an actuator housing in which a coil and a magnet armature are arranged, wherein the magnet armature interacts electromagnetically with the coil in order to move the magnet armature, wherein the magnet armature is connected to an actuation element for actuating the valve, wherein an actuation opening for the actuation element is provided at an axial actuator end of the actuator housing, and wherein the actuator is controllable by power electronics.

The invention further relates to a piston compressor comprising at least one valve for controlling a media flow of a compression medium and having an actuator for actuating the valve, as well as a valve assembly for arrangement on a piston compressor, with a receiving housing in which a valve is arranged and with an actuator fastened to the receiving housing for actuating the valve.

In piston compressors hitherto a mechanical or hydraulic valve control has been used to control the inlet and outlet valves. Such a mechanical or hydraulic valve control is, however, relatively complex, prone to wear and therefore expensive to manufacture and maintain. In order to allow the simplest possible, low-maintenance and, in particular, flexible valve control, electromagnetic actuators are being used more and more frequently for valve actuation. However, very high requirements are placed on actuators of this type, the structure and mode of operation of which are fundamentally known in the prior art, when used for valve actuation. In particular, on the one hand, a short actuation time and a valve stroke that can be precisely set and reproducible over the largest possible range should be made possible, on the other hand, low energy consumption, high reliability, long service life, and a compact design should be ensured at the same time.

Particularly in the case of large compressors, in which relatively large masses have to be moved for valve control, the available electromagnetic actuators reach their limits. In order to meet the required boundary conditions, particularly powerful coils are required in this case, which usually require a relatively large installation space. The coils are loaded with large electrical currents during operation, which results in a relatively large amount of heat generated. The temperatures in the region of the coils of an actuator can be in the range >120° C., for example. Since the temperature-sensitive power electronics for controlling the coils of the actuator are not suitable for such high temperatures, they have previously been arranged as far away from the coils as possible, for example in a separate housing, in order to reduce the ambient temperature of the power electronics to an acceptable level. Although this allowed the sensitive electronic components to be protected from excessively high temperatures, the complexity of the entire actuator was further increased because, for example, electric lines were required between the external housing and the actuator. Apart from this, of course, this increases the installation space required for the actuator. However, this is particularly disadvantageous in applications in which the space available for arranging the actuators, including lines, is limited.

SUMMARY OF THE INVENTION

It is therefore the object of the invention to provide an electromagnetic actuator for actuating the valve of a piston compressor which is constructed as simply and compactly as possible and which at the same time meets the high requirements in terms of efficiency, low maintenance, reliability, and long service life.

The object is achieved according to the invention in that the power electronics is arranged in the actuator housing between the coil and the axial actuator end on which the actuation opening is provided, wherein the power electronics are separated from the coil by a housing wall of the actuator housing, wherein a printed circuit board of the power electronics is arranged on a fastening surface provided on the housing wall, wherein electrical coil contacts of the coil extend through the housing wall and are connected to the printed circuit board. As a result, the power electronics can be arranged in a thermally favorable manner between the coil and the axial actuator end, whereby an improved dissipation of the heat generated by the coil is achieved. The heat can thereby advantageously be dissipated from the interior of the actuator via the housing wall to the actuator housing and via the axial actuator end, for example, to a compressor housing of a piston compressor.

The actuator housing is preferably made of a thermally conductive material, preferably metal, particularly preferably aluminum, at least in the region of the housing wall. As a result, improved heat dissipation can be achieved through the housing wall.

In order to further improve the heat dissipation from the power electronics to the housing wall, it is advantageous if at least one heat conducting element is arranged between the fastening surface of the housing wall of the actuator housing and the printed circuit board.

The heat conducting element is advantageously connected to the printed circuit board, preferably by means of a heat-conductive adhesive or heat-conductive adhesive tape. This allows for better heat transfer from the printed circuit board to the heat conducting element.

If a heat conducting element is provided, at least temperature-sensitive electronic components of the printed circuit board, in particular MOSFETs, are preferably arranged in the region of the heat conducting element. This is advantageous in order to protect at least the most sensitive components.

It is also advantageous if the power electronics are at least partially covered with a thermally conductive casting compound. As a result, the heat dissipation from the electronic components of the power electronics can be further improved.

The electromagnetically actuated actuator is preferably used on a piston compressor in order to actuate a valve, preferably a suction valve, of the piston compressor by means of the actuation element of the actuator.

BRIEF DESCRIPTION OF THE DRAWINGS

In the following, the present invention is described in greater detail with reference to FIGS. 1 to 2 which, by way of example, show a schematic and non-limiting advantageous embodiment of the invention. In the figures.

DETAILED DESCRIPTION

Figure 1:
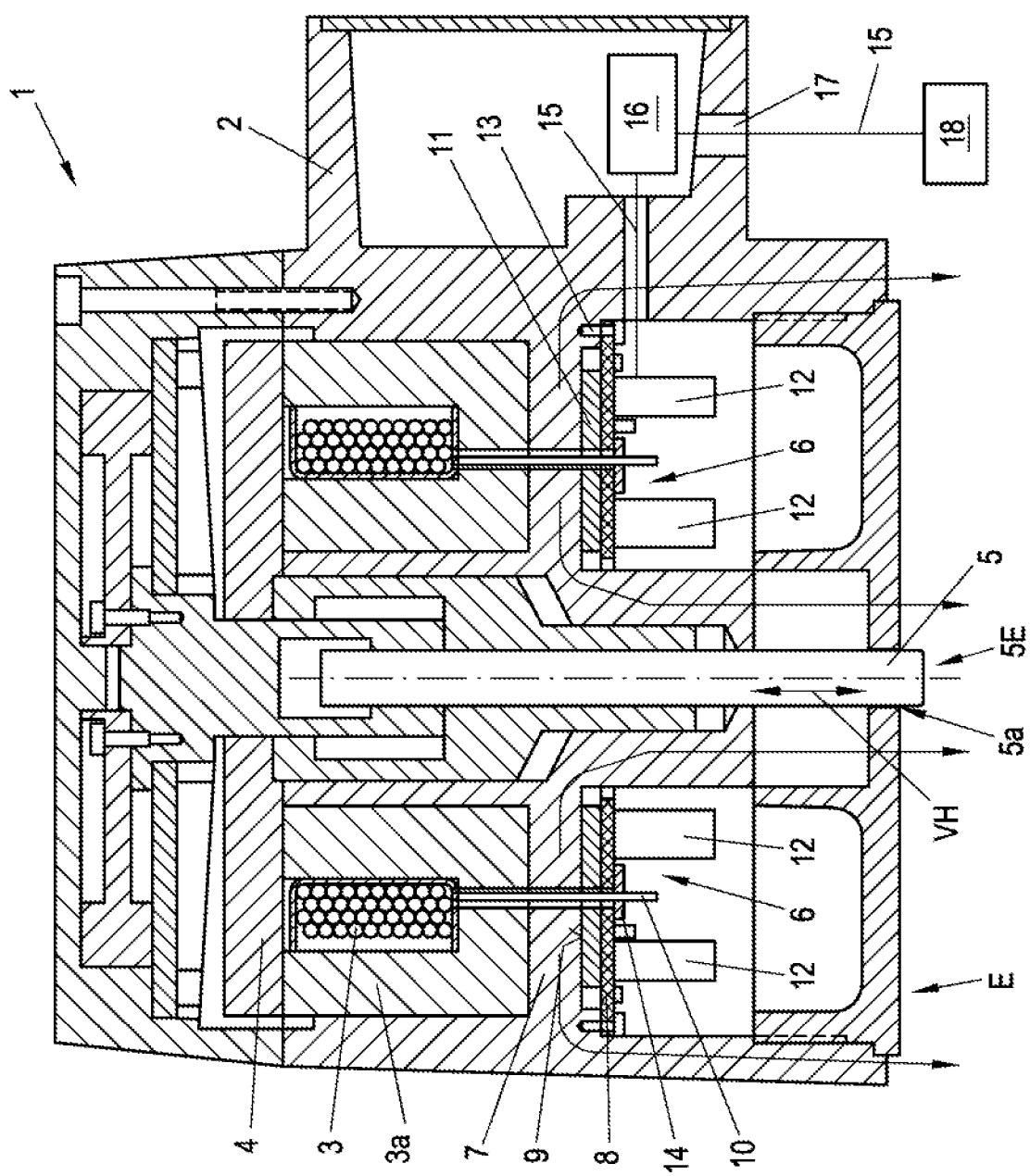
FIG. 1 is a sectional view of the actuator in an advantageous embodiment.

In FIG. 1, the actuator 1 according to the invention is shown in a longitudinal section. The actuator 1 shown comprises an actuator housing 2 in which at least one coil 3 and at least one magnet armature 4 interacting therewith are arranged. For example, a plurality of coils 3 can also be arranged uniformly around the circumference, or the coil 3 could have a plurality of segments which are arranged uniformly around the circumference. The magnet armature 4 could then have a plurality of armature segments corresponding to the coils 3 or the coil segments in the circumferential direction. The specific design of the coil(s) and the magnet armature 4 is however not substantial for the invention. The invention is therefore explained below with reference to one coil 3 and a magnet armature 4 interacting therewith. The coil 3 and the magnet armature 4 interact electromagnetically in order to move the magnet armature 4 axially. For this purpose, the coil 3 can be supplied with electrical voltage or current in order to generate a magnetic field, by means of which a magnetic force of attraction can be generated on the magnet armature 4. The magnet armature 4 can be attracted in the direction of the coil 3 by the magnetic force of attraction. A return spring can be provided to reset the magnet armature 4. A plurality of coils 3 can of course also be arranged, but for the sake of simplicity reference is made in the following to one coil 3.

The region in which the magnet armature 4 can be moved is referred to as the armature stroke. The size of the armature stroke depends substantially on the specific structural design of the actuator 1, which in turn depends on the area of application of the actuator 1. The armature stroke can for example be in the range of a few millimeters. The coil 3 is preferably embedded in an iron core 3a with the highest possible magnetic conductivity or surrounds such. The iron core 3a serves to bundle the magnetic flux generated by the coil 3 and to conduct it into the magnet armature 4. The structure and mode of operation of an electromagnetic actuator are fundamentally known, which is why they will not be discussed in more detail at this point.

The magnet armature 4 is connected to an actuation element 5 which, starting from the magnet armature 4, extends axially substantially centrally through the actuator 1. An actuation opening 5a for the actuation element 5 is provided at an axial actuator end E of the actuator housing 2.

The actuation element 5 is axially displaceable in the actuation opening 5a; the actuation opening 5a thus substantially serves to guide the actuation element 5. In the example shown, an end portion 5E of the actuation element 5 protrudes in the axial direction from the actuation opening 5a of the actuator housing 2. However, this is not absolutely necessary, but substantially depends on the specific structural design of the actuator 1 and the actuation portion of the valve that preferably interacts therewith. For example, the end portion 5E of the actuation element 5 could also lie within the actuator housing 2, the actuation portion of the valve interacting therewith in this case extending partially axially through the actuation opening 5a inward into the actuator housing 2. In any case, however, an actuation opening 5a is provided at the axial actuator end E. In the assembled state of the actuator 1 on a piston compressor 19 (not shown in FIG. 1), the axial actuator end E of the actuator 1 faces the piston compressor 19 (see FIG. 2).

In the example shown, the actuation element 5 is substantially surrounded by the coil 3 in a ring shape. The actuation element 5 serves to actuate a valve (not shown) in order to open and/or close the valve. For this purpose, the armature stroke is transmitted to the valve via the actuation element 5, which results in a so-called valve stroke VH, as is indicated in FIG. 1. In the simplest case, the valve stroke VH can correspond to the armature stroke. It is possible, however, that transmission elements are also provided between the magnet armature 4 and the actuation element 5, for example, in order to generate a specific transmission ratio between the armature stroke and the valve stroke VH. As a result, for example, the valve stroke VH could be increased relative to the armature stroke and at the same time the available force for actuating the valve could be reduced (or vice versa). When actuating the actuator 1, a relative movement takes place between the magnet armature 4 and between the actuation element 5 and the actuator housing 2.

In order to actuate the actuator 1, the coil 3 can be controlled electrically by power electronics 6. The power electronics 6 are to be understood as those components which are provided in a suitable form for supplying energy to the coil 3. This includes, for example, the conversion and/or amplification of electrical quantities such as current, voltage, frequency, etc. in order to control the coil 3 in the desired manner. For this purpose, the power electronics 6 comprise at least one printed circuit board 8 on which specific electronic components 12 (resistors, capacitors, MOSFETs, etc.) are arranged, which are connected in a suitable manner to the printed circuit board 8, for example soldered, glued, plugged, etc. As mentioned at the outset, the power electronics 6 was previously arranged outside the actuator housing 2, for example in a separate housing, and was connected to the actuator housing 2, in particular to the coil 3 arranged therein, via suitable electric lines.

This was in particular due to the fact that the electronic components 12 arranged on the printed circuit board 8 are generally very temperature-sensitive. On the one hand, this can mean that some electronic components and/or soldered connections are damaged at or above a specific temperature and are thereby completely or at least partially restricted in their function. However, it usually also means that the losses of some electronic components, such as MOSFETs, for example, increase disproportionately with increasing temperature, which is also disadvantageous for energy-efficient operation of the actuator 1. In particular, the temperatures inside the actuator housing 2 were previously inadmissibly high due to the heat emitted by the coil 3, so that it would have led to damage and/or reduced functionality of the power electronics 6 and, as a result, of the actuator 1 as a whole. Particularly in safety-relevant applications, for example when actuating valves of gas compressors, such restrictions are unacceptable because, in this case, there are high demands with regards to the durability and availability of the actuator (e.g., standardized requirements according to a specific safety integrity level—"SIL"). An arrangement of the power electronics 6 within the actuator housing 2 has therefore been avoided so far.

In order to still be able to meet the requirements mentioned, it is provided, according to the invention, that the power electronics 6 are arranged in the actuator housing 2 between the coil 3 and the axial actuator end E and are separated from the coil 3 by a housing wall 7 of the actuator housing 2. The printed circuit board 8 of the power electronics 6 is arranged on a fastening surface 9 provided on the housing wall 7. The electrical coil contacts 10 of the coil 3 extend through the housing wall 7 and are connected to the printed circuit board 8, as can be seen in FIG. 1. Suitable openings, such as bores, for example, are provided in the housing wall 7 for this purpose. The separation by means of the housing wall 7 creates, on the one hand, thermal shielding of the power electronics 6, in particular the electronic components 12 arranged thereon, from the coil 3. In addition, by a thermally favorable positioning of the power electronics 6 between the coil 3 and the axial actuator end E, an improved dissipation of the heat generated by the coil 3 is achieved. The heat can thereby advantageously be dissipated from the interior of the actuator 1 via the housing wall 7 to the actuator housing 2 and via the axial actuator end E to the compressor housing 20 of the piston compressor 19 (see FIG. 2).

The power electronics 6 can be supplied with energy and control commands can be transmitted, for example, via a suitable electrical line 15, which can, for example, be passed through an opening 17 provided on the side of the actuator 1. It is possible that an actuator control unit 16 is also provided on the actuator 1, which receives, processes, and transmits control commands from a superordinate control unit 18, for example from a compressor control unit, to the power electronics 6. The power electronics 6 could, however, also be controlled directly by the superordinate control unit 18. Depending on a predetermined control program, the control unit(s) 16, 18 can control the actuator 1 with control commands for moving the magnet armature 4 or the actuation element 5, for example to open/close a valve of a compressor. A very flexible volume control of a compressor can thus be carried out, for example.

The actuator housing 2 is preferably made, at least in the region of the housing wall 7, from a material with the highest possible thermal conductivity in order to achieve the best possible heat dissipation. Advantageous materials are suitable metals such as aluminum or an aluminum alloy, but of course other materials would also be conceivable. The printed circuit board 8 is fastened to the fastening surface 9 of the housing wall 7 with a suitable fastening means 13. In the example shown, a plurality of screws are provided as fastening means 13, which are arranged distributed at suitable intervals on the circumference of the printed circuit board 8 and are screwed to the actuator housing 2, in particular to the housing wall 7. Of course, other forms of fastening would also be conceivable, for example a suitable plug connection or adhesive connection. However, screws are advantageous in order to allow the power electronics 6 to be assembled and replaced more easily.

As can be seen in FIG. 1, the coil contacts 10 of the coil 3 extend, in this case axially, through the housing wall 7 and are connected to the printed circuit board 8 on the side of the housing wall 7 opposite the coil (on which the fastening surface 9 is provided). In order to produce an electrically conductive connection between the coil contacts 10 and the printed circuit board 8, suitable holding elements 14 are preferably provided on the printed circuit board 8. The holding elements 14 can be designed, for example, with positive or frictional locking, for example in the form of plug-in or clamp connections known in the prior art.

In order to further improve the heat dissipation of the actuator 1, it is advantageous if at least one heat conducting element 11 is arranged between the fastening surface 9 of the housing wall 7 of the actuator housing 2 and the printed circuit board 8. A molded plate made of aluminum or another suitable material with good heat conducting properties can be provided as the heat conducting element 11. The heat transfer between the printed circuit board 8 and the housing wall 7 is improved by the heat conducting element 11. It is particularly advantageous if the heat conducting element 11 is connected to the printed circuit board 8. As a result, the entire power electronics 6 can be used as an already preassembled component in the actuator housing 2, as a result of which the assembly of the actuator 1 and in particular also the maintenance can be facilitated. The heat conducting element 11 is preferably fastened to the printed circuit board 8 by means of a heat-conductive adhesive or adhesive tape in order to ensure good heat transfer between the circuit board 8 and the heat conducting element 11. In the example shown, the fastening surface 9 on the housing wall 7 is stepped in order to create sufficient space for the heat conducting element 11.

If a heat conducting element 11 is provided, it is also advantageous if at least temperature-sensitive electronic components 12 of the printed circuit board 8 are arranged in the region of the heat conducting element 11. In particular, if only a limited space is available for the arrangement of the heat conducting element 11, it may be the case that not all electronic components 12 of the printed circuit board 8 have space in the region of the heat conducting element 11. In this case, it is advantageous if at least those components 12 that are particularly temperature-sensitive, such as MOSFETs, are arranged in the region of the heat conducting element 11. In order to utilize the improved heat conduction of the heat conducting element 11 as well as possible, as many, preferably all, electronic components 12 as possible should of course be arranged in the region of the heat conducting element 11.

In the example shown in FIG. 1, the heat conducting element 11 does not extend all the way to the outer radial edge of the printed circuit board 8 for the purpose of illustration. In this case, the heat conducting element 11 is radially spaced by a gap from the step of the fastening surface 9. This means that the electronic components arranged on the printed circuit board 8, which (in this case) lie below the gap, do not benefit from the improved thermal conductivity of the heat conducting element 11. The heat conducting element 11 should therefore advantageously cover as large a region of the printed circuit board 8 as possible. It is also particularly advantageous if the power electronics 6 are at least partially coated with a thermally conductive casting compound (not shown). This results in improved heat transfer from the electronic components 12 (which are coated with the casting compound) via the printed circuit board 8 into the housing wall 7, possibly via the heat conducting element 11.

Figure 2:
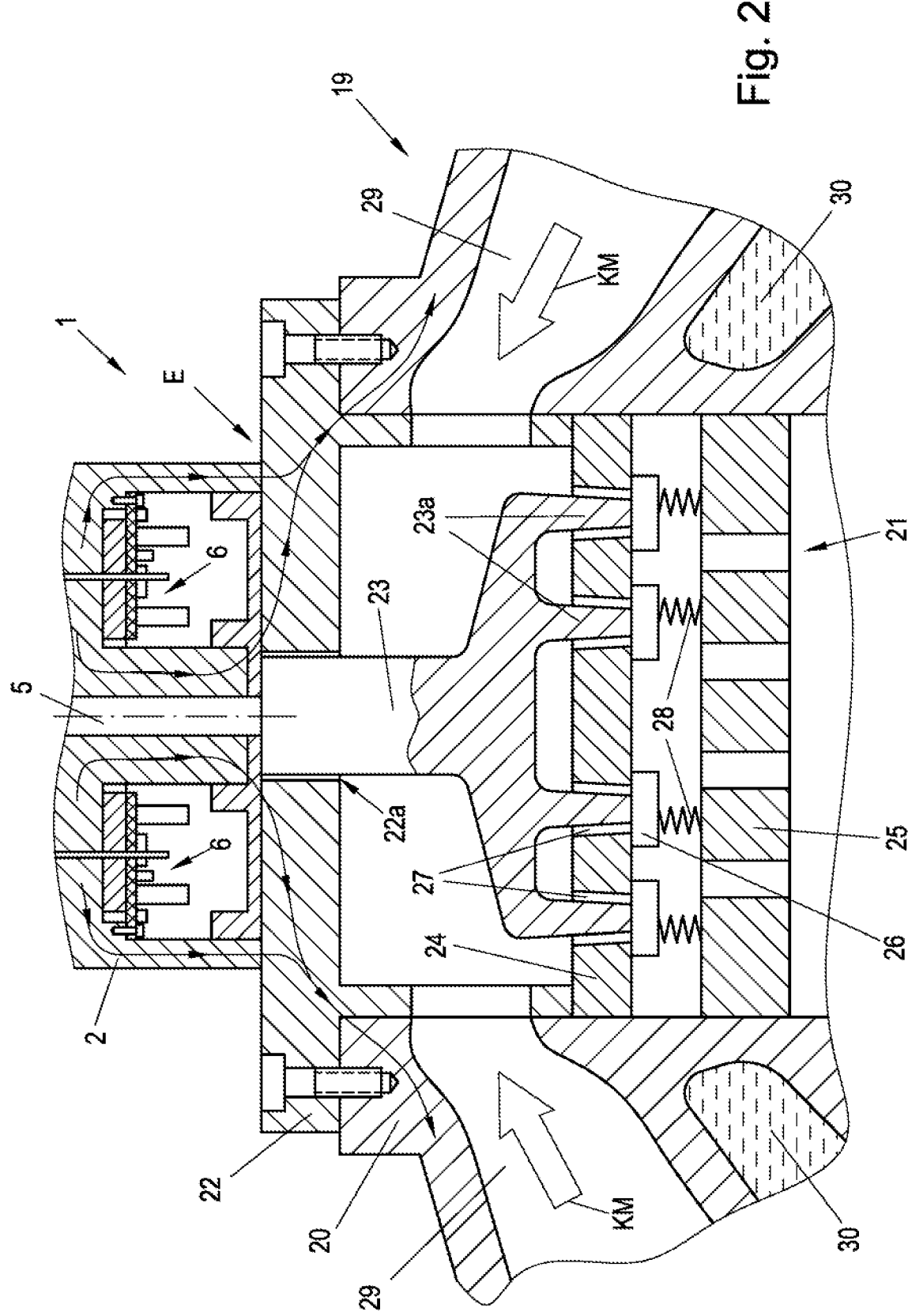
FIG. 2 is a sectional view of the actuator in the assembled state on a suction valve of a piston compressor.

The electromagnetically actuated actuator 1 is provided for actuating a valve of a piston compressor 19, in particular a suction valve 21 of a piston compressor 19, as will be explained below with reference to FIG. 2. FIG. 2 shows an axial section through the actuator 1 in the assembled state on the piston compressor 19. In the example shown, the actuator 1 is part of a valve assembly which can be arranged as an entire unit in an opening provided for this purpose in the compressor housing 20 of the piston compressor 19. The valve assembly comprises a receiving housing 22 (as part of the compressor housing 20), the actuator 1 and a valve, in this case, the suction valve 21. The actuator 1 is arranged on the receiving housing 22, for example screwed to it or fastened to it in another suitable manner. The receiving housing 22 is arranged in the opening provided for this purpose in the compressor housing 20 of the piston compressor 19 and is screwed to the compressor housing 20, as indicated schematically. The valve is arranged within the receiving housing 22. For actuating the suction valve 21, the actuation element 5 of the actuator 1 actuates an unloader 23 in the example shown, which unloader is arranged axially displaceably in the receiving housing 22 of the suction valve 21. In order to be able to actuate the unloader 23 by the actuation element 5, an opening 22a is provided in the receiving housing 22. It is possible that an interposed force transmission member, such as a push rod, can also be provided. The structure and function of a suction valve 21 with an unloader 23 is known in principle, for example from AT 509 878 B1, which is why the mode of operation is only described with reference to the most substantial components.

The suction valve 21 usually consists of a valve seat 24 and a valve catcher 25. A valve element 26, which can be moved back and forth between the valve seat 24 and valve catcher 25, is arranged in between. In the simplest case, the valve element 26 can be a well-known valve plate. The valve element 26 interacts with the valve seat 24 in order to take over the sealing function by closing and releasing annular through channels 27 in the valve seat 24. For this purpose, the valve element 26 can be spring-loaded by spring elements 28 arranged on the valve catcher 25. The spring elements 28 thus press the valve element 26 against the valve seat 24. The unloader 23 has unloader fingers 23a which reach through the through channels 27 of the valve seat 24 and abut against the valve element 26 in order to actuate the valve element 26. The unloader 23 serves, for example, to start up the compressor without load or to switch the compressor 19 to the idle operation mode or for the volume control of the compressor 19.

If the actuator 1, as indicated in FIG. 2, is arranged on a piston compressor 19, the heat generated by the coil 3 of the actuator 1 can be dissipated from the actuator housing 2 to the compressor housing 20, as indicated by the arrows in FIG. 2. In the example shown, the valve is designed as a suction valve 21 and is arranged in the valve assembly. As mentioned, the valve assembly comprises the suction valve 21 including its components mentioned above as well as the receiving housing 22 in which the valve 21 is arranged and the actuator 1 which is fastened to the receiving housing 22. In the example shown, the heat flows in particular from the actuator housing 2 via the receiving housing 22 of the valve assembly to the compressor housing 20. Usually the compressor housing 20 of the compressor 19 is cooled in the region of the suction valve 21 by a cooling medium flowing through the compressor housing 20. In the simplest case, the cooling medium can be the suctioned compression medium KM (e.g., a gaseous medium such as air or a process gas) itself, as is indicated in FIG. 2 by the arrows in the suction channels 29. However, a separate cooling circuit with its own cooling medium could also be provided, for example in the case of water cooling, as indicated by the water jacket 30.

The coil 3 reaches the highest temperatures during operation, which can typically be 120° C. to 130° C. In comparison, the power electronics 6 is a subordinate heat source and reaches temperatures of 100° C. to 110° C. during operation, in particular on semiconductor switches such as MOSFETs that are usually installed. The components of the power electronics 6 have a maximum permissible operating temperature, for example 125° C. for high-temperature electronic components. For this reason alone, it was previously not possible to arrange the power electronics 6 in the vicinity of the coil 3, since there is a risk that the electronic components will overheat and be damaged or destroyed due to the temperature of the adjacent coil 3. Due to the inventive arrangement of the power electronics 6, however, the piston compressor 19 itself can be used as a heat sink for the actuator 1.

As a result of the cooling of the compressor housing 20, temperatures of typically a maximum of 70° C. are set on the compressor housing 20 or, in this case, in particular on the receiving housing 22 of the valve assembly. Because of this low temperature and the thermal connection of the actuator 1 to the compressor 19, a temperature gradient is established between the coil 3 and the compressor 19. In this way, heat is dissipated from the actuator 1 in the direction of the cooler compressor 19 and the power electronics 6 are thereby cooled. Only in this way is it possible to arrange the power electronics 6 in the vicinity of the coil 3 and in the actuator housing 2 of the actuator 1. The cooling by convection on the surface of the actuator housing 2 of the actuator 1 would not be sufficient for this purpose. Measurements on an actuator 1 have shown that the inventive arrangement of the power electronics 6 allows the maximum temperature in the region of the power electronics 6 to be kept at <110° C., whereby the electronic components of the power electronics 6 are protected against overheating.

The arrangement of the power electronics 6 on the housing wall 7 in the actuator housing 2 between the coil 3 and the axial actuator end E of the actuator 1 consequently results in sufficient cooling of the power electronics 6, because the heat generated in the actuator 1 is dissipated to the compressor housing 20 via the housing wall 7 and the axial actuator end E of the actuator housing 2. The cooling of the compressor 19 can thus advantageously be used to achieve improved heat dissipation from the actuator 1.

The invention claimed is:

1. Electromagnetically actuated actuator for arrangement on a piston compressor, the actuator configured to actuate a suction valve of the piston compressor, the actuator comprising:
   an actuator housing including a coil, power electronics, housing wall and a magnet armature arranged therein, wherein the magnet armature is configured and arranged to interact electromagnetically with the coil to effect movement of the magnet armature;
   an actuation element connected to the magnet armature and configured and arranged to actuate the suction valve of the piston compressor;
   an actuation opening for the actuation element positioned at an axial actuator end of the actuator housing;
   the power electronics arranged in the actuator housing between the coil and the axial actuator end of the actuator housing on which the axial actuator end of the actuation opening for the actuation element is provided, the power electronics is configured and arranged to control the actuator;
   wherein the housing wall, being axially disposed between the coil and said axial actuator end, separates the power electronics from the coil, wherein the housing wall is an integral part of the actuator housing and includes a fastening surface axially arranged between the coil and said axial actuator end;
   wherein the power electronics includes a printed circuit board arranged on the fastening surface, wherein the fastening surface is axially arranged between the coil and the printed circuit board; and
   wherein the coil includes electrical coil contacts that extend through the housing wall and through the fastening surface and said electrical coil contacts are connected to the printed circuit board arranged on the fastening surface.

2. The electromagnetically actuated actuator according to claim 1, characterized in that the actuator housing consists, at least in the region of the housing wall, of a thermally conductive material.

3. The electromagnetically actuated actuator according to claim 1, further including at least one heat conducting element arranged between the fastening surface of the housing wall and the printed circuit board, wherein the conducting element is configured to improve a thermal conductivity between the printed circuit board and the housing wall.

4. The electromagnetically actuated actuator according to claim 3, characterized in that the at least one heat conducting element is connected to the printed circuit board.

5. The electromagnetically actuated actuator according to claim 3, wherein the printed circuit board includes temperature-sensitive electronic components arranged in the region of the at least one heat conducting element.

6. The electromagnetically actuated actuator according to claim 1, characterized in that the power electronics are at least partially covered with a thermally conductive casting compound.

7. Piston compressor comprising:
at least one valve configured and arranged to control a media flow of a compression medium,
an electromagnetically actuated actuator configured and arranged for actuating the at least one valve, the electromagnetically actuated actuator including
an actuator housing including a coil, power electronics, housing wall and a magnet armature arranged therein, and wherein the magnet armature is configured and arranged to interact electromagnetically with the coil to effect movement of the magnet armature,
an actuation element connected to the magnet armature and configured and arranged to actuate the valve,
an actuation opening for the actuation element positioned at an axial actuator end of the actuator housing,
the power electronics arranged in the actuator housing between the coil and the axial actuator end of the actuator housing on which the axial actuator end of the actuation opening for the actuation element is provided, the power electronics is configured and arranged to control the actuator,
wherein the housing wall, being axially disposed between the coil and said axial actuator end, separates the power electronics from the coil and includes a fastening surface axially arranged between the coil and said axial actuator end,
wherein the power electronics includes a printed circuit board arranged on the fastening surface, wherein the fastening surface is axially arranged between the coil and the printed circuit board, and
wherein the coil includes electrical coil contacts that extend through the housing wall and through the fastening surface in an axial direction and wherein said electrical coil contacts are connected to the printed circuit board arranged on the fastening surface.

8. The piston compressor according to claim 7, further comprising a compressor housing and a cooling medium for cooling the compressor housing in the region of the valve, wherein the actuator is arranged on the compressor housing and the actuator is configured and arranged to cool the actuator in the region of the power electronics such that the heat generated by the coil is dissipated to the compressor housing via the housing wall and the axial actuator end of the actuator.

9. Valve assembly for arrangement on a piston compressor, the valve assembly comprising:
a receiving housing in which a valve is arranged and an electromagnetically actuated actuator fastened to the receiving housing, the electromagnetically actuated actuator being configured and arranged to actuate the valve,
wherein the electromagnetically actuated actuator comprises
an actuator housing including a coil, power electronics, housing wall and a magnet armature arranged therein, and wherein the magnet armature is configured and arranged to interact electromagnetically with the coil to effect movement of the magnet armature,
an actuation element connected to the magnet armature and configured and arranged to actuate the valve via an opening arranged in the receiving housing,
an actuation opening for the actuation element positioned at an axial actuator end of the actuator housing,
the power electronics arranged in the actuator housing between the coil and the axial actuator end of the actuator housing on which the axial actuator end of the actuation opening for the actuation element is provided, the power electronics is configured and arranged to control the actuator,
wherein the housing wall, being axially disposed between the coil and said axial actuator end, separates the power electronics from the coil and includes a fastening surface axially arranged between the coil and said axial actuator end,
wherein the power electronics includes a printed circuit board arranged on the fastening surface, wherein the fastening surface is axially arranged between the coil and the printed circuit board,
wherein the coil includes electrical coil contacts that extend through the housing wall and through the fastening surface and said electrical coil contacts are connected to the printed circuit board arranged on the fastening surface; and
wherein the actuator housing consists, at least in the region of the housing wall, of a thermally conductive metal.

10. The electromagnetically actuated actuator according to claim 2, wherein the actuator housing consists of metal.

11. The electromagnetically actuated actuator according to claim 2, wherein the actuator housing consists of aluminum.

12. The electromagnetically actuated actuator according to claim 4, wherein the at least one heat conducting element is connected to the printed circuit board by means of a heat-conductive adhesive or heat-conductive adhesive tape.

13. The piston compressor of claim 7, wherein the at least one valve is a suction valve.

14. The valve assembly of claim 9, wherein the valve is a suction valve.

* * * * *